Oct. 31, 1933.  D. S. BARROWS  1,932,811
CUSHIONING MECHANISM
Filed April 18, 1928  3 Sheets-Sheet 1

Inventor
Donald S. Barrows

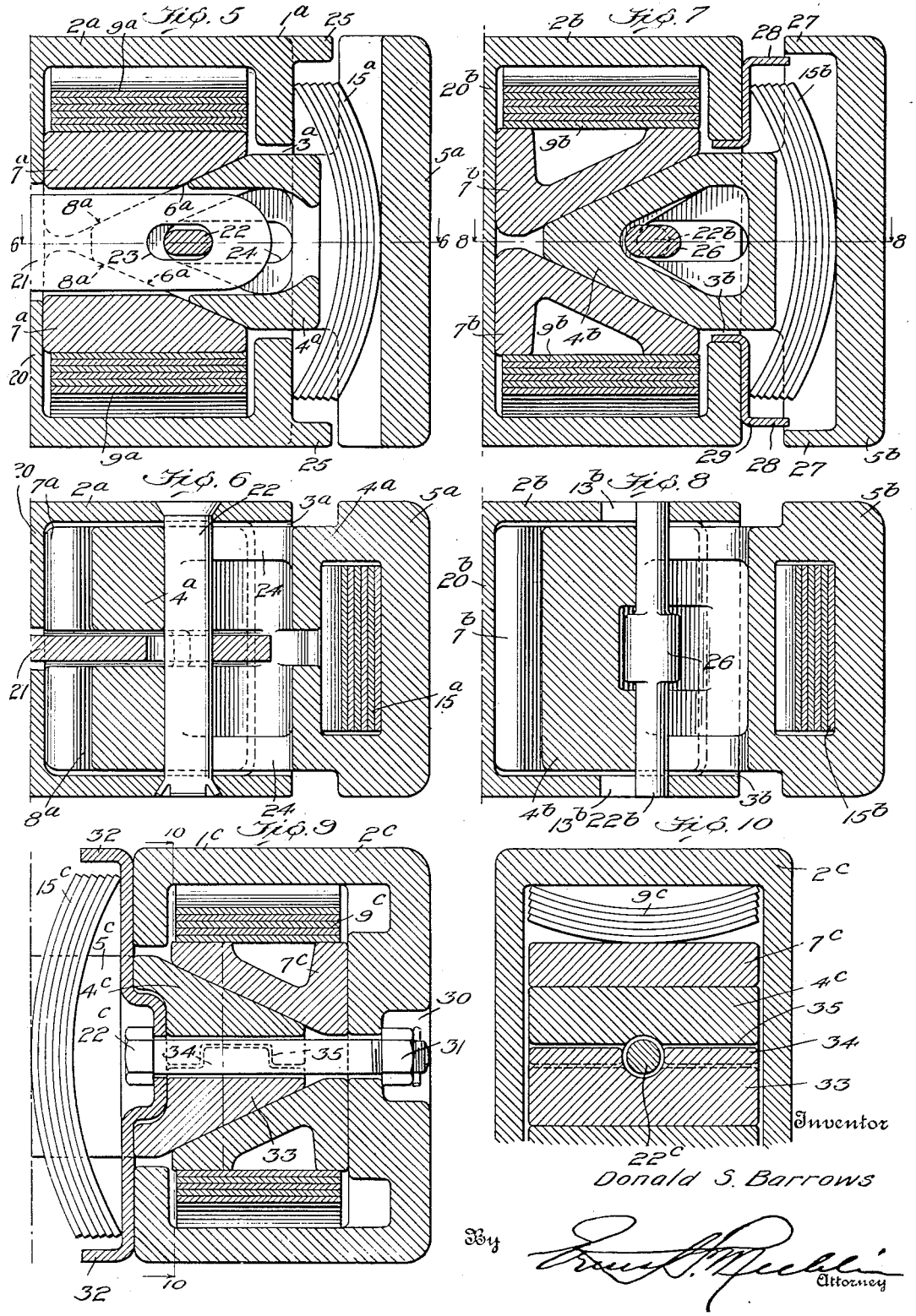

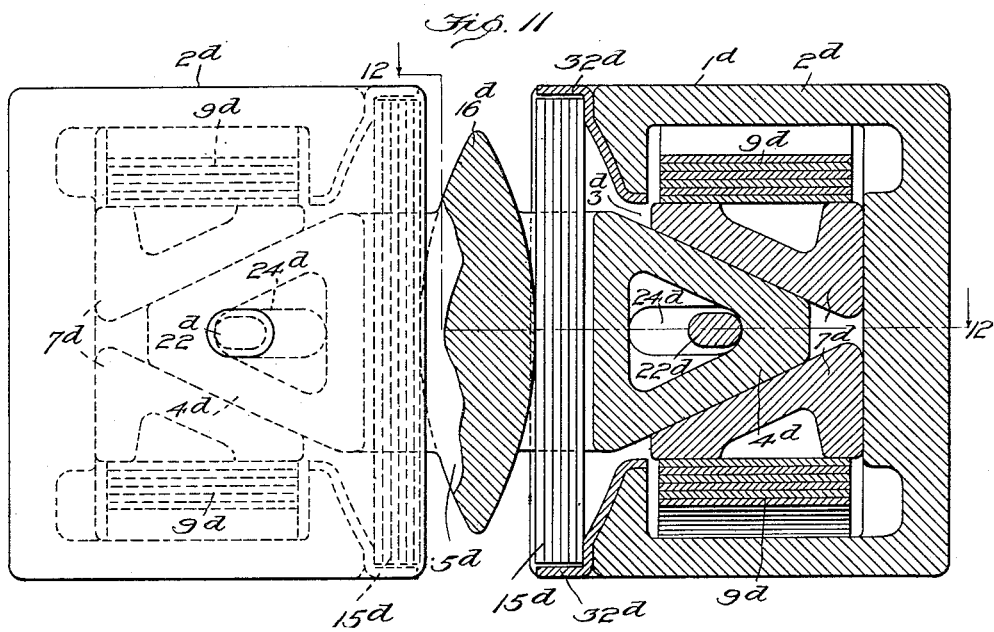
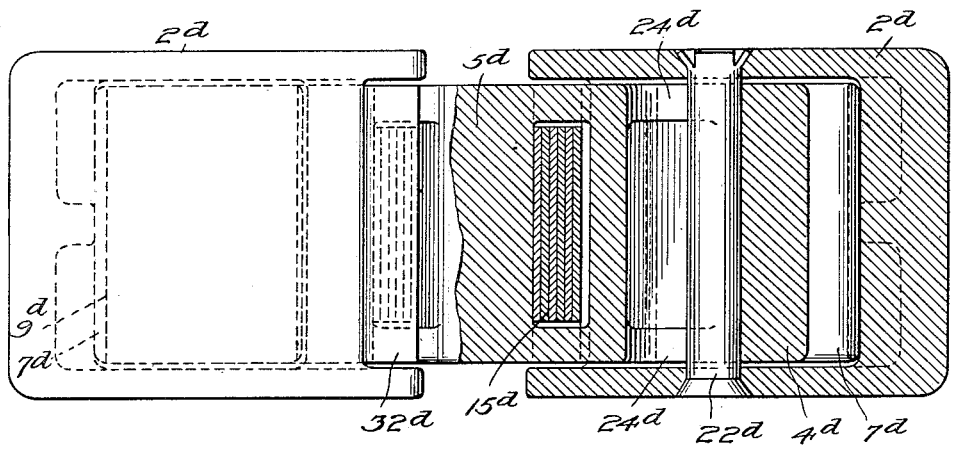

Patented Oct. 31, 1933

1,932,811

UNITED STATES PATENT OFFICE 1,932,811

CUSHIONING MECHANISM

Donald S. Barrows, Rochester, N. Y., assignor to The Gould Coupler Company, New York, N. Y., a corporation of Maryland Application April 18, 1928. Serial No. 270,921

15 Claims. (Cl. 213—30)

This invention relates to cushioning mechanism particularly adapted for railway rolling stock and more especially to a friction draft gear employing plate springs as the resilient means.

The principal object of my invention, generally considered, is to provide a friction draft gear using plate springs for holding the friction generating elements together and for effecting the release of the gear, said gear being adapted to develop high capacity and have a long life.

Another object of my invention is to provide a friction draft gear with a high ultimate capacity in which the resilient means are plate springs whereby the elements of the gear may be disposed in a relatively small space.

A further object of my invention is to provide a cushioning mechanism particularly adapted for use with railway draft rigging involving a double ended gear with a housing containing curved leaf springs which press together laterally movable friction shoes and a follower cooperating with each end of said housing and formed with an integral wedge portion extending therein and acting to separate said shoes upon compression of the gear, each follower containing plate springs between the outer end thereof and the wedge portion for effecting release of the gear.

Other objects and advantages of the invention relating to the particular arrangement and construction of the various parts will become apparent as the description proceeds.

Referring to the drawings illustrating my invention, the scope whereof is defined by the appended claims:

Figure 5 is a fragmentary longitudinal sectional view corresponding to Figure 1 but showing a modification.

Figure 6 is a longitudinal sectional view on the line 6—6 of Figure 5, looking in the direction of the arrows.

Figure 7 is a sectional view corresponding to Figure 5 but showing another modification.

Figure 8 is a longitudinal sectional view on the line 8—8 of Figure 7, looking in the direction of the arrows.

Figure 9 is a longitudinal sectional view corresponding to Figure 7 but showing a still further modification.

Figure 10 is a fragmentary sectional view on the line 10—10 of Figure 9, looking in the direction of the arrows.

Figure 11 is a partial longitudinal sectional and partial side elevational view of another modification of my invention.

Figure 12 is a partial plan or elevational view and partial longitudinal sectional view on the line 12—12 of Figure 11.

Figure 1:
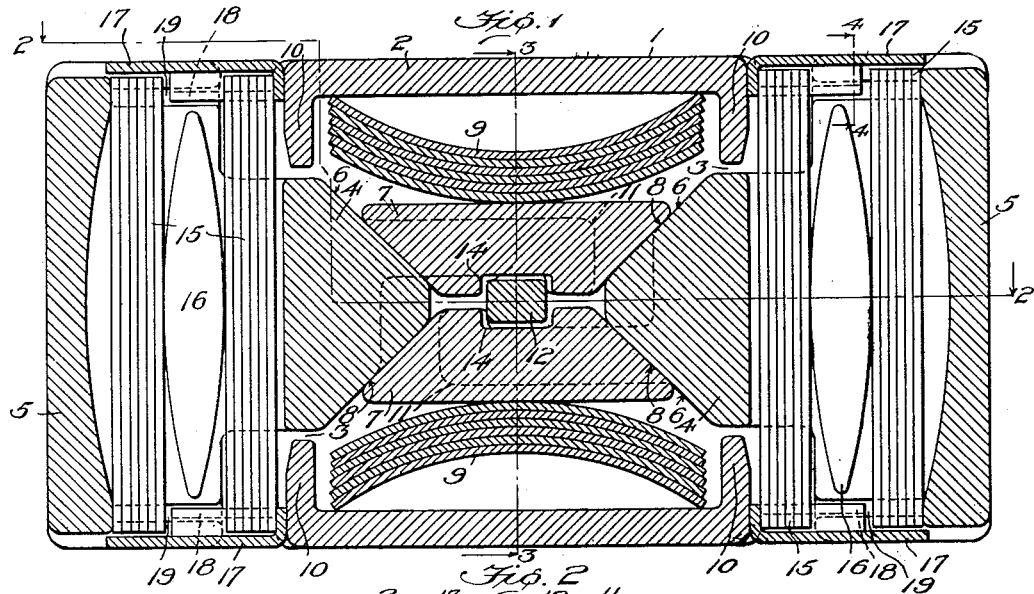
Figure 1 is a longitudinal sectional view of one embodiment of my cushioning mechanism, on the line 1—1 of Figure 2, looking in the direction of the arrows.
Figure 2:
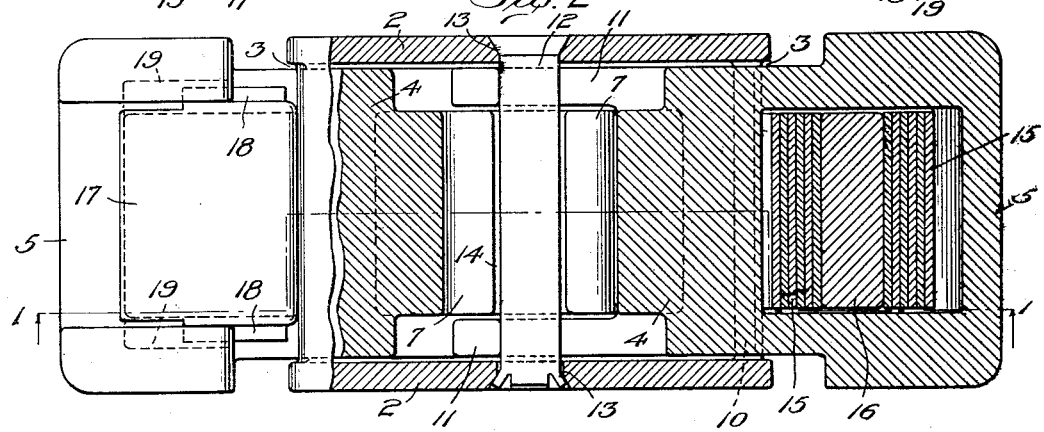
Figure 2 is a partial sectional view on the line 2—2 of Figure 1, looking in the direction of the arrows.
Figure 3:
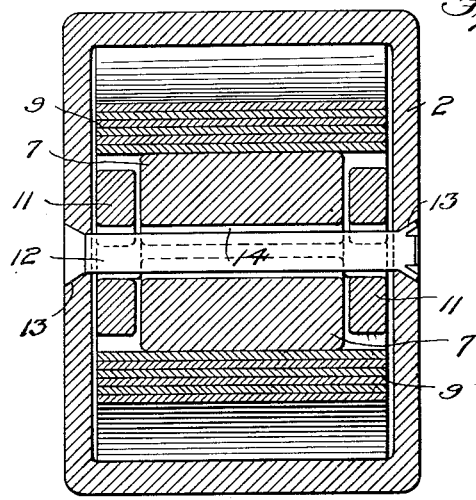
Figure 3 is a transverse sectional view on the line 3—3 of Figure 1, looking in the direction of the arrows.
Figure 4:
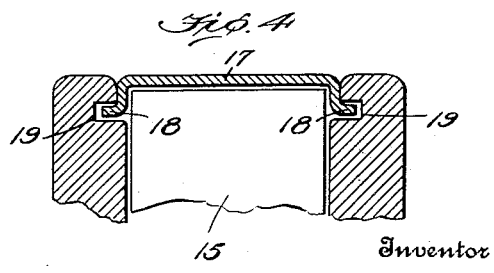
Figure 4 is a fragmentary transverse sectional view on the line 4—4 of Figure 1, looking in the direction of the arrows.

Referring to the drawings in detail, like parts being designated by like reference characters, and first considering the embodiment of my invention illustrated in Figures 1 to 4, inclusive, there is shown a cushioning mechanism 1 especially adapted for use as a railway draft gear with any usual or desired type of draft rigging. Said mechanism comprises a housing 2 provided with openings 3 at the ends thereof for receiving wedge blocks 4 which, in the present embodiment, are formed integral with end followers 5.

Said wedge blocks 4 are provided with inclined friction surfaces 6 converging together adjacent their inner ends, that is the ends nearest the center of the housing 2. Engaging said wedge blocks 6 are friction blocks or shoes 7 formed with correspondingly inclined friction surfaces 8 engaging the friction surfaces 6 on the wedge blocks 4. In order to hold said shoes in engagement with the wedge blocks to generate friction at the engaging friction surfaces, resilient means 9, in the present embodiment taking the form of curved plate springs, are provided between the outer surfaces of the friction shoes 7 and the adjacent surfaces of the housing 2. It will be appreciated that upon compression of the gear the wedge blocks 4 act to separate the shoes 7 and flatten the leaf springs 9 against the engaging walls of the housing 2. The inwardly extending end wall portions or flanges 10 defining the openings 3 in the housing embrace the leaf springs 9 and maintain them in the desired position.

In order to hold the parts of the gear in assembled relation when separated from the associated rigging, the followers 5 are preferably formed with hook portions 11 extending toward each other on either side of a rivet or pin 12 which passes through corresponding apertures 13 in the sides of the housing 2 between the friction shoes 7, said shoes being preferably notched, as indicated at 14, to receive said pin which is preferably rectangular in section. When the gear is assembled the hook portions 11 engage the pin 12 and limit outward movement of the followers 5 while permitting the desired amount of inward movement, as will be understood.

In order to insure release of the gear as well as to increase the spring capacity thereof, a plurality of plate springs 15 is provided, said springs in the present embodiment being normally flat and adapted to be curved upon a compression of the gear about a convex fulcrum block 16 disposed intermediate the springs of each nest of plate springs 15, the end wall of the follower portion 5 being formed concave to permit the bending of said plate springs thereagainst. In order to retain said springs in desired relation with respect to the followers, spring clips or plates 17 are provided and formed with inwardly disposed flanged portions 18 engaging in corresponding notches 19 in the sides of the followers 5, whereby relative longitudinal movement of said spring plates or retainers 17 is permitted upon compression of the gear and bending of the plate springs 15.

From the foregoing description it will be apparent that upon the application of compressive force to the followers 5 the integral wedge blocks 4 immediately start to separate the friction shoes 7 against the resistance of the springs 9, said compressive force thereby being resisted not only by the friction developed between the surfaces 6 and 8 but by the springs 9. In addition to the spring resistance 9, the compressive force on the gear is also resisted by the springs 15 which, when the gear is compressed, are bent about the convex fulcrum block 16 and into the concave inner face of each follower 5, said bending being effected by the engagement between the housing 2 and the inner ends of the spring clips or plates 17 into which the followers telescope with the flanges 18 sliding in grooves 19 in said followers.

Referring now to the embodiment of my invention illustrated in Figures 5 and 6, a draft gear 1$^a$ is there disclosed quite similar to the gear 1 of the first embodiment, only one half of said gear 1$^a$ being illustrated as the other half is symmetrical with that shown. Said gear comprises a housing 2$^a$ open at each end, as indicated at 3$^a$, for receiving the wedge blocks 4$^a$ which are integral with the corresponding followers 5$^a$. As in the previous embodiment, the wedge blocks 4$^a$ are provided with inclined friction surfaces 6$^a$, said surfaces, however, being inclined at a more acute angle than the corresponding surfaces 6 of the first embodiment. Engaging the wedge blocks 4$^a$ are friction shoes or wedges 7$^a$ formed with correspondingly inclined friction surfaces 8$^a$ engaging the corresponding surfaces 6$^a$ on the wedge blocks. Curved plate springs 9$^a$ are provided between the outer surfaces of the friction shoes 7$^a$ and the adjacent walls of the housing 2$^a$ for urging said shoes inwardly into engagement with the respective wedges 4$^a$.

As contra-distinguished from the first embodiment, the shoes 7$^a$ are formed with inclined friction surfaces on one end only so that two pairs of shoes are employed rather than only one pair as in the first embodiment, said pairs being separated by inwardly extending partition walls 20 frictionally engaged by the shoes 7$^a$ which, however, are apertured adjacent the longitudinal center line of the housing for receiving the plate 21 which is engaged at either end by a rivet or pin 22 which passes through corresponding apertures 23 therein and through the corresponding sides of the housing 2$^a$.

The purposes of the rivets or pins 22 is to hold the parts of the gear assembled even while separated from the rigging and to effect this object the wedge portions 4$^a$ are slotted, as indicated at 24, to receive the pin 22, said pin thereby limiting outward movement of the followers 5$^a$ with respect to the housing but permitting the desired inward movement thereof. The purpose of the plate 21 is to provide a center support for the pin 22 whereby the same is placed in quadruple rather than merely double shear.

As in the first embodiment, releasing springs 15$^a$ are provided, said springs, however, being normally curved rather than straight and engaging the inner surfaces of the follower portions 5$^a$ at their outer or convex sides, the outer ends at the concave sides of said plates engaging the adjacent ends of the housing 2$^a$ whereby upon compression of the gear said springs 15$^a$ are flattened against the inner surface of the follower 5$^a$. In order to retain the springs in place the housing is provided with outwardly extending lugs 25 overlying the ends of the springs 15$^a$. The action of the gear upon the application of compressive forces is analogous to that of the first embodiment, as will be understood.

Referring now to the form of my invention illustrated in Figures 7 and 8, a construction is there disclosed which is very similar to that of the embodiment of Figures 5 and 6, a housing 2$^b$ being provided open at each end, as indicated at 3$^b$, for receiving the wedge block portions 4$^b$ formed as before integral with the followers 5$^b$. Said wedge blocks 4$^b$, as in the previous embodiment, cooperate with corresponding friction shoes or wedges 7$^b$ in a similar manner, said shoes being urged together by curved plate springs 9$^b$.

As in the previous embodiment, a partition 20$^b$ divides the housing into two compartments, said partition, however, being operatively imperforate as no plate corresponding to the plate 21 of the previous embodiment is used. As in the previous embodiment said partition provides a friction generating surface against which the inner sides of the shoes 7$^b$ act, whereby the capacity of the gear is increased. For preventing undesired disengagement of the followers 5$^b$ from the housing 2$^b$, a pin 22$^b$ is provided, said pin being retained in place by an enlarged inner portion 26 which normally prevents disengagement of the pin but which can be moved to free said pin from the housing 2$^b$ upon compression of the gear 1$^b$ as the slots 13$^b$ in the sides of the housing are sufficient in size to permit withdrawal of the enlarged portion 26 therethrough.

As in the previous embodiment, releasing springs 15$^b$ are employed and the inner side of the follower 5$^b$ is pocketed or provided with inwardly extending flanges 27, said flanges telescoping with flanges 28 on spring clips 29 engaging the outer sides of the housing 2$^b$ for maintaining said springs in proper operative relation. It will also be understood that the spring clips 29 serve as wear plates against which the ends of the curved leaf springs 15$^b$ bear. Except as specifically described, the construction of the present embodiment may correspond with that of the previous embodiment.

Referring now to the embodiment of my invention illustrated in Figures 9 and 10, a construction is there disclosed which corresponds with the embodiment illustrated in Figures 7 and 8 except that instead of there being a single housing, a pair of housings 2ᶜ are employed, one at each end of the gear 1ᶜ, the release springs 15ᶜ being disposed inwardly and abutting one another, only one half of the gear being illustrated rather than being disposed outwardly and abutting the inner surface of the follower portion.

As in the previous embodiment, the friction shoes or wedges 7ᶜ are pressed toward each other by curved plate springs 9ᶜ. The friction shoes 7ᶜ are separated when the gear is compressed by engagement with the ends of the intermediate follower or double-ended wedge member 5ᶜ, the ends of which are formed with inclined friction surfaces corresponding with the friction surfaces on the shoes 7ᶜ. The outer or transversely extending surfaces of the shoes 7ᶜ engage the inner surface of the end wall of the housing and develop additional friction which increases the capacity of the gear.

For holding the parts in assembled relation a bolt 22ᶜ is provided extending longitudinally through each housing 2ᶜ, the outer side of said housing around the aperture for the bolt being countersunk or formed with a pocket 30 receiving the nut 31 on the end of the bolt 22ᶜ for preventing said bolt from protruding beyond the end of the housing. Said bolt serves to retain the intermediate follower or corresponding wedge portion 4ᶜ thereof between the housing and a plate 32 which also functions as a spring clip for holding the release springs 15ᶜ in proper operative relation with respect to the gear. The wedge-shaped ends of the follower 5ᶜ may be formed with a removable portion 33 interlocking with the fixed wedge-shaped end 4ᶜ of the follower to facilitate assembly and disconnection of the parts of the gear, as will be understood. When the gear is assembled the part 33 is held in proper relation to the fixed part 4ᶜ by being pressed toward it between the friction shoes 7ᶜ and prevented from longitudinal disengagement by the tongue portions 34 fitting in corresponding notches 35 in the fixed portion 4ᶜ of the follower 5ᶜ. Although the bolt 22ᶜ prevents withdrawal of the wedge-shaped ends of the intermediate follower 5ᶜ from the housings 2ᶜ of the gear 1ᶜ, it will be understood that it permits the desired longitudinal movement of the wedge-shaped ends in the housings 2ᶜ for effecting the outward movement of the friction shoes 7ᶜ, as in the previous forms of my invention. Otherwise the construction and operation of the present embodiment may correspond with that of the previous modification.

Referring now to the embodiment of my invention illustrated in Figures 11 and 12, a draft gear 1ᵈ is illustrated quite similar to the form of gear 1ᶜ illustrated in Figures 9 and 10. As in said previous form, the gear or cushioning mechanism is provided with a housing 2ᵈ at each end thereof, each housing being open at its inner end, as indicated at 3ᵈ, for receiving the wedge-shaped ends 4ᵈ of the intermediate follower 5ᵈ. The wedge-shaped ends 4ᵈ are provided with inclined friction surfaces engaged by friction shoes or wedge blocks 7ᵈ disposed in the housings 2ᵈ and frictionally engaging the inner surfaces of the end walls thereof. As in the previous embodiments, said friction shoes 7ᵈ are inwardly pressed by curved leaf springs 9ᵈ.

For effecting the release of the gear, plate springs 15ᵈ are provided formed as one set disposed between each wedge-shaped end 4ᵈ of the follower 5ᵈ and an intermediate convex fulcrum block portion 16ᵈ about which the springs 15ᵈ are bent upon compression of the gear. The end of said springs rest against the ends of the adjacent housings 2ᵈ and preferably are received by spring clips 32ᵈ which retain said springs in the desired assembled relation and also act as wear plates therefor. The inner surfaces of the inner ends of the housings 2ᵈ are preferably curved to correspond with the curvature of the fulcrum block 16ᵈ and the spring clips 32ᵈ are preferably correspondingly formed and interfit thereagainst.

For retaining the parts of the gear in assembled relation a bolt or pin 22ᵈ may be provided extending through each housing 2ᵈ and received in slotted portions 24ᵈ in the wedge-shaped ends of the follower 5ᵈ. The ends of the pin or rivet 22ᵈ are secured from undesired removal in any desired manner as by upsetting or countersunk heads on the ends thereof, as illustrated. Said pins 22ᵈ permit the desired longitudinal movement of the wedge portions 4ᵈ in the housings 2ᵈ but prevent entire disengagement of the parts, as will be understood. Except as specifically described, the present form of cushioning mechanism may correspond with that of the previous form.

From the foregoing disclosure it will be apparent that I have devised cushioning mechanism particularly adapted for use with railway draft rigging which is composed of a housing receiving spring and friction elements and open at one or both ends for a wedge portion or portions engaging the friction elements, said wedge portion or portions being associated with leaf or plate springs for effecting release of the mechanism. All of the parts are of relatively simple configuration so that they may be economically manufactured and on account of utilizing leaf springs the capacity of the gear is made relatively high for the space which it occupies.

Having thus described my invention, I claim:

1. Cushioning mechanism comprising a follower, a wedge block extending therefrom and integrally connected thereto, a pocket formed between said follower and wedge block, a housing, friction blocks movable laterally in said housing by said wedge block, and resilient means disposed outwardly of said friction blocks and compressible against the sides of the housing upon movement of said friction blocks, and resilient release means disposed in said pocket and extending to either side beyond said wedge block to act on said housing.

2. Cushioning mechanism comprising a housing, outwardly movable friction shoes in said housing, resilient means pressing said shoes inwardly, a follower disposed outside of said housing with a wedge portion acting to separate said friction shoes upon compression of the mechanism, and means extending longitudinally from said follower beyond said wedge portion into said housing for interlocking therewith.

3. Cushioning mechanism comprising a housing, curved plate springs disposed adjacent opposite sides of said housing, friction shoes engaging said plate springs and inwardly pressed thereby, said friction shoes having diverging friction surfaces, a follower, a wedge block integral therewith and formed with correspondingly inclined friction surfaces engaging the friction surfaces on the friction shoes whereby upon compression of the gear said wedge block separates said shoes against the resistance of the springs, said follower being formed with a pocket behind the wedge block, and plate spring means in said pocket, the end portions of said spring means normally acting on the adjacent outer surface of the housing to effect release of the mechanism.

4. Cushioning mechanism comprising a housing, a follower cooperating with each end of said housing, a wedge block actuated by each follower and extending into said housing, each wedge block formed with inclined friction surfaces, a pair of friction shoes with correspondingly inclined friction surfaces engaging the friction surfaces on the wedge blocks, curved plate springs disposed in said housing and engaging the outer surfaces of said friction shoes for urging them into engagement with the wedge blocks, and release spring means disposed between each follower and the associated wedge block and with end portions extended laterally beyond said blocks and acting on the housing.

5. Cushioning mechanism comprising a follower, a wedge block extending therefrom, a housing, friction blocks movable laterally in said housing by said wedge block, resilient means disposed outwardly of said friction blocks and compressible against the sides of the housing upon movement of said friction blocks, and resilient means disposed adjacent said wedge block and with intermediate portions acting on said follower and end portions acting on said housing for effecting release of the mechanism.

6. Cushioning mechanism comprising a housing, outwardly movable friction shoes in said housing, resilient means pressing said shoes inwardly, a follower casting comprising a force-receiving portion and an integral wedge portion with a pocket therebetween, said wedge portion acting to separate said friction shoes upon compression of the mechanism, and resilient means with intermediate portions disposed in said pocket and end portions extending laterally therefrom and acting longitudinally on the housing to effect release of the mechanism.

7. Cushionng mechanism comprising a housing, curved plate springs disposed adjacent opposite sides of said housing, friction shoes engaging said plate springs and inwardly pressed thereby, said friction shoes having diverging friction surfaces, a follower, a wedge block integral therewith and formed with correspondingly inclined friction surfaces engaging the friction surfaces on the friction shoes, whereby upon compression of the gear said wedge block separates said shoes against the resistance of the springs, and plate springs disposed in a pocket between the follower and wedge block and with end portions extending out of said pocket and acting on the adjacent portions of the housing to effect release of the gear.

8. Cushioning mechanism comprising a housing, follower means exterior of and cooperating with an end of said housing, a wedge block integral with said means and extending into said housing, said wedge block formed with inclined friction surfaces, a pair of friction shoes with correspondingly inclined friction surfaces engaging the friction surfaces on the wedge block, curved plate springs disposed in said housing and engaging the outer surfaces of said friction shoes and urging them into engagement with the wedge block, and means extending through said housing and engaged by extensions from said follower means for holding the parts of the mechanism in assembled relation.

9. Cushioning mechanism comprising a follower, a wedge block integral therewith, a housing, friction blocks movable laterally in said housing by said wedge block, resilient means disposed outwardly of said friction blocks and compressible against the sides of the housing by said blocks, plate springs with intermediate portions disposed in a pocket between said follower and wedge block and acting on said follower, and end portions extending laterally from said pocket and acting on said housing for effecting release of the mechanism, and a bolt extending through said housing and wedge block for holding the parts in assembled relation.

10. Cushioning mechanism comprising a housing, outwardly movable friction shoes in said housing, curved plate springs pressing said shoes inwardly toward each other, followers with integral wedge portions acting from opposite sides of the housing to separate said friction shoes upon compression of the mechanism, and plate springs disposed with intermediate portions engaging said followers and end portions acting on the corresponding ends of the housing for effecting release of the mechanism.

11. Cushioning mechanism comprising a pair of relatively movable housings, curved plate springs disposed adjacent opposite sides of said housings, friction shoes engaged by said plate springs and inwardly pressed thereby, said friction shoes forming diverging friction surfaces, a follower, wedge-shaped extensions on the ends of said follower received in said housings between said friction shoes, whereby upon compression of the gear the housings approach one another and said wedge-shaped extensions separate said shoes against resistance of the associated springs, and plate springs disposed between said wedge-shaped extensions and with end portions extending laterally beyond said extensions and acting on said housings for effecting release of the mechanism.

12. Cushioning mechanism comprising a housing formed with side walls and transversely extending flanges providing inwardly opening pockets, a follower, a wedge block movable by said follower, friction blocks disposed in said housing and movable laterally by said wedge block, resilient means disposed in said housing pockets and acting on said friction blocks, normally flat plate springs disposed between said follower and wedge block and arranged as two groups, and a fulcrum block disposed between said groups and presenting convex surfaces thereto for flexing said springs, the outer edge portions of the group adjacent said wedge block acting on the housing for effecting release of the mechanism.

13. Cushioning mechanism comprising a housing, a follower disposed adjacent each end of said housing, a wedge block disposed between each follower and housing and extending into the latter, each wedge block having inclined friction surfaces, a pair of friction shoes disposed in said housing with the adjacent portions correspondingly inclined and normally engaging the wedge blocks, resilient means disposed in said housing and acting between the side walls of the housing and the adjacent surfaces of said shoes for urging the latter into engagement with the wedge blocks, pockets being provided between said followers and associated wedge blocks, spring means fitting in said pockets, said means in each pocket comprising two groups of normally flat plate springs, and a fulcrum block disposed between the groups and presenting convex surfaces thereto for flexing said springs thereabout, the adjacent surfaces of the followers being curved concavely to facilitate flexing of said springs, the outer edges of the groups adjacent said housing being adapted to act on the corresponding ends thereof for urging said followers outwardly therefrom.

14. Cushioning mechanism comprising a housing, a follower cooperating with each end thereof, a wedge block connected to each follower and extending into said housing, each wedge block having inclined friction surfaces, a pair of friction shoes with correspondingly inclined friction surfaces engaging the friction surfaces on the wedge block, resilient means disposed in said housing and engaging the outer surfaces of said friction shoes for urging them into engagement with the wedge blocks, means for holding the parts assembled comprising pins extending through registering apertures in the housing and wedge blocks, and link means extending longitudinally of the housing and connecting intermediate portions of said pins for improving the effective strength thereof.

15. Cushioning mechanism comprising a pair of housings, resilient means disposed adjacent opposite sides of said housing, friction shoes in said housings engaged by said resilient means and inwardly pressed thereby, said friction shoes forming diverging friction surfaces, a follower disposed intermediate said housings, said follower having wedge shaped ends received in said housings between said friction shoes whereby upon compression of the gear said shoes are separated against the resistance of said resilient means, said follower comprising an intermediate fulcrum block with the surfaces thereof convex, and a group of normally flat plate springs disposed between said fulcrum block and each wedge shaped end of the follower, the ends of said springs acting on the adjacent housings for effecting release of the mechanism.

DONALD S. BARROWS.